(12) United States Patent
Bruce et al.

(10) Patent No.: US 11,685,131 B2
(45) Date of Patent: Jun. 27, 2023

(54) METHODS AND SYSTEMS FOR MAKING A LENS ASSEMBLY

(71) Applicant: CooperVision International Limited, Fareham (GB)

(72) Inventors: Ian Bruce, Southampton (GB); Robert Oag, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 296 days.

(21) Appl. No.: 17/031,941

(22) Filed: Sep. 25, 2020

(65) Prior Publication Data

US 2021/0094251 A1    Apr. 1, 2021

(30) Foreign Application Priority Data

Sep. 30, 2019  (EP) ..................... 19200663
Sep. 30, 2019  (GB) ..................... 1914111

(51) Int. Cl.
  *B29D 11/00*  (2006.01)
  *G02C 11/00*  (2006.01)

(52) U.S. Cl.
  CPC ........ *B29D 11/00817* (2013.01); *B29D 11/00* (2013.01); *G02C 11/10* (2013.01)

(58) Field of Classification Search
  CPC .... B29D 11/00817; B29D 11/00; G02C 11/10
  See application file for complete search history.

(56) References Cited

U.S. PATENT DOCUMENTS

| 4,781,452 A | 11/1988 | Ace |
| 2004/0194880 A1 | 10/2004 | Jiang et al. |
| 2005/0073739 A1 | 4/2005 | Meredith et al. |
| 2007/0153231 A1 | 7/2007 | Iuliano |
| 2008/0231801 A1 | 9/2008 | Iuliano |
| 2011/0157544 A1 | 6/2011 | Pugh et al. |
| 2012/0268712 A1 | 10/2012 | Egan et al. |

(Continued)

FOREIGN PATENT DOCUMENTS

| WO | 2007027821 A2 | 3/2007 |
| WO | 2015103102 A1 | 7/2015 |

OTHER PUBLICATIONS

International Search Report and Written Opinion issued in corresponding International Patent Application No. PCT/GB2020/052365 dated Dec. 8, 2020 (16 pages).

(Continued)

*Primary Examiner* — Mathieu D Vargot
(74) *Attorney, Agent, or Firm* — Kilyk & Bowersox, P.L.L.C.

(57) ABSTRACT

Methods and apparatus for making lens assemblies that can be placed on an eye of a person and that include at least one component are described. Generally, a first lens member (100) and a second lens member (200) are formed. The second lens member (200) is transferred to a compliant stage (210). At least one component is placed in contact with one of the lens members (100, 200). The second lens member (200) is placed in contact with the first lens member (100) such that the compliant stage (210) can provide compression to the first and second lens members (100, 200). The second lens member (200) and the first lens member (100) are coupled together to form a lens assembly (10) with the at least one component located between the two lens members (100, 200).

16 Claims, 6 Drawing Sheets

(56) References Cited

U.S. PATENT DOCUMENTS

| | | |
|---|---|---|
| 2013/0122132 A1 | 5/2013 | Pugh et al. |
| 2014/0085726 A1 | 3/2014 | Portney |
| 2014/0264977 A1 | 9/2014 | Pugh et al. |
| 2015/0370093 A1 | 12/2015 | Waite et al. |
| 2016/0004098 A1 | 1/2016 | Waite et al. |
| 2016/0317090 A1 | 11/2016 | Han et al. |
| 2017/0131569 A1 | 5/2017 | Aschwanden et al. |
| 2017/0131571 A1 | 5/2017 | Waite et al. |
| 2017/0293158 A1 | 10/2017 | Markus et al. |
| 2017/0371180 A1 | 12/2017 | Harant et al. |
| 2018/0045980 A1 | 2/2018 | Linhardt et al. |
| 2018/0217402 A1 | 8/2018 | Larmagnac et al. |
| 2019/0048180 A1 | 2/2019 | Harant et al. |
| 2019/0049784 A1 | 2/2019 | Lin et al. |
| 2019/0121161 A1 | 4/2019 | Peng et al. |

OTHER PUBLICATIONS

Written Opinion issued in corresponding International Patent Application No. PCT/GB2020/052365 dated Sep. 1, 2021 (8 pages).
Combined Search and Examination Report issued in corresponding United Kingdom Application No. GB1914111.8 dated Mar. 26, 2020 (5 pages).
Extended European Search Report issued in corresponding European Application No. 19200663.3 dated Apr. 15, 2020 (9 pages).
International Preliminary Report on Patentability issued in corresponding International Patent Application No. PCT/GB2020/052365 dated Feb. 8, 2022 (6 pages).

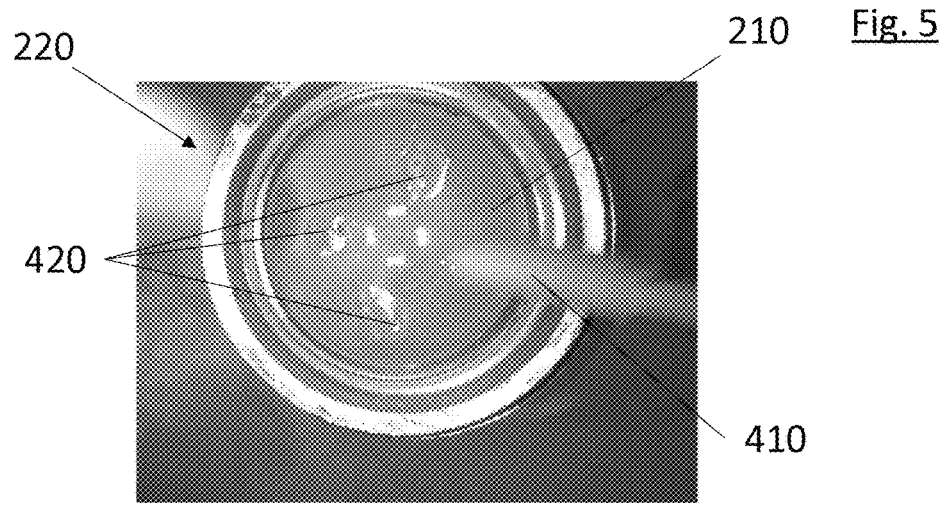
Fig. 5
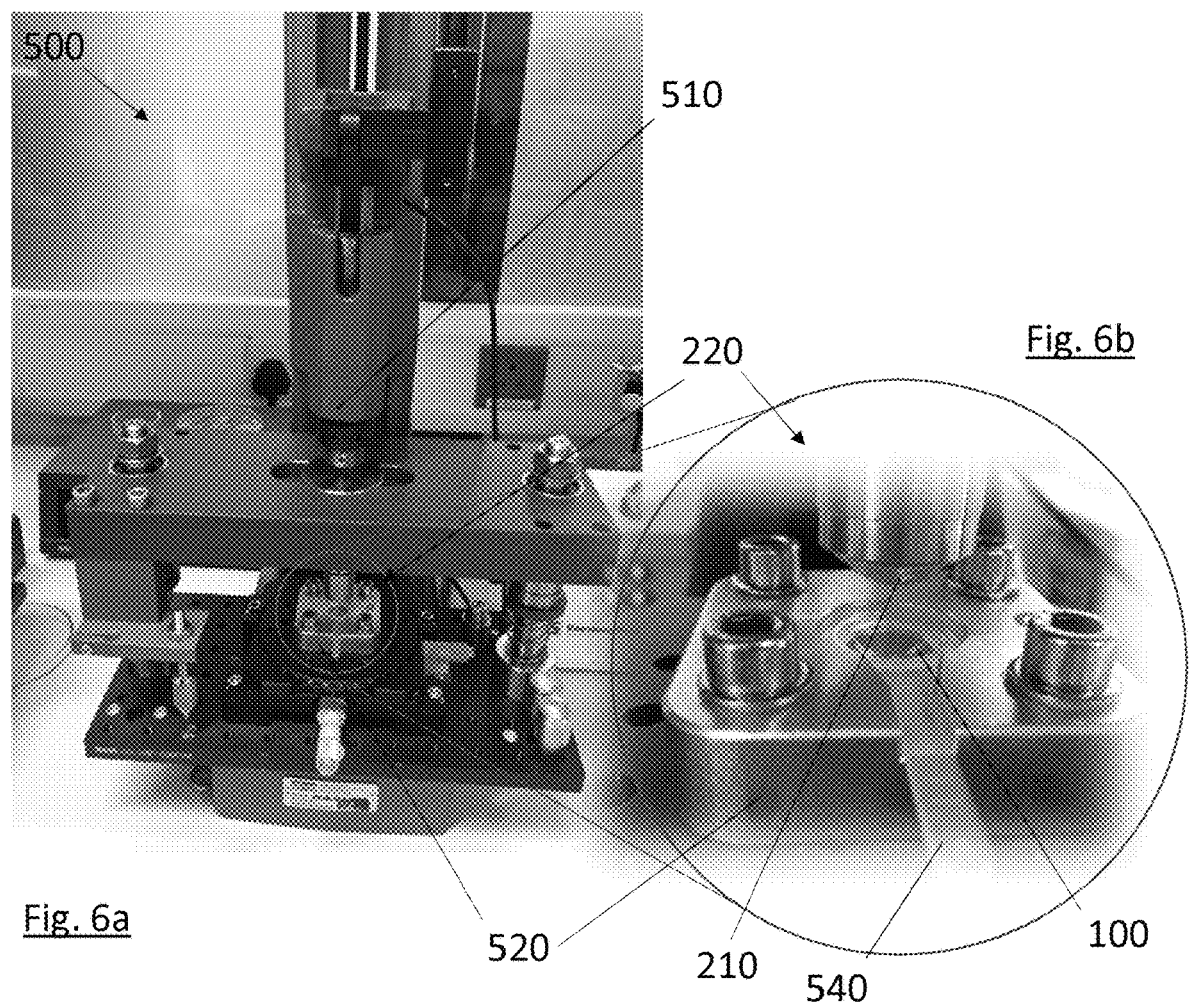
Fig. 6a
Fig. 6b

METHODS AND SYSTEMS FOR MAKING A LENS ASSEMBLY

FIELD

The present disclosure is directed to one or more lens assemblies that may include one or more fluid or rigid components, and more specifically, to methods and systems for making such lens assemblies. The present methods and systems are particularly useful in making lens assemblies that are contact lenses, or in making lens assembly components to be incorporated into contact lenses.

BACKGROUND

It has been proposed to make contact lenses by bonding together two or more contact lens members, i.e. component layers of the lens. It has also been proposed to include fluid or rigid components (e.g. electronics) in contact lenses.

Fluid or rigid components may be less flexible than the materials (for example silicone hydrogel materials) that make up the lens and on which they are mounted. The incorporation of such components (which may include but is not limited to electronic components, fluid filled cavities and/or other ion-impermeable components) into a contact lens is not straightforward. This is particularly the case for commercial scale manufacture where any manufacturing process must be effective and repeatable in order to avoid unacceptable levels of rejects i.e. lenses that do not meet the relevant quality standards. In particular, minor imperfections during assembly of the lens members and components may have a significant impact on the optical properties of the resulting lens thereby resulting in a lens that does not meet the relevant quality standards. Accordingly, there remains a need for improved methods and apparatus for use in the manufacture of lens assemblies including one or more components, such as fluid components or rigid components. The lens assemblies resulting from any such process must also exhibit clinically acceptable on-eye movement and not bind to the eye or eyes of a person.

Examples of lenses with inserts or embedded components have been described, such as in US20070153231; US20080231801; US20110157544; US20120268712; US20130122132; US20140085726; US20150370093; US20160004098; US20170131569; US20170131571; US20170293158; US20170371180; US20180217402; US20190048180; or US20190049784.

There remains a need for lens assemblies to be made more consistently than existing techniques permit where alignment of the lens assembly materials is improved and optical quality of the lens assembly is achieved.

SUMMARY

It has now been determined that use of a compliant stage during assembly of a lens assembly containing and/or suitable for containing one or more components, such as one or more fluid or rigid (e.g. electronic) components, and the like, may improve the accuracy, quality and/or reliability of the bonding between the lens members and/or components.

A first aspect of the invention provides a method of making a lens assembly, the method having the features as described herein. A second aspect of the invention provides an apparatus for making a lens assembly, the apparatus having the features as described herein. Preferred but optional features of the invention are set out in the dependent claims.

Additional aspects and embodiments of the present methods and apparatus will be apparent from the following description, drawings, and claims. As can be appreciated from the foregoing and following description, each and every feature described herein, and each and every combination of two or more of such features, is included within the scope of the present invention provided that the features included in such a combination are not mutually inconsistent. In addition, any feature or combination of features may be specifically excluded from any embodiment of the present invention.

BRIEF DESCRIPTION OF THE DRAWINGS

Examples of the methods and apparatuses of this disclosure will now be described with reference to the accompanying drawings.

FIG. 5 is a close-up plan view of the component of FIG. 3 during a stage in the manufacture of the component.

FIG. 6*a* is a front view of an example closing apparatus used in a method of making the contact lens of FIG. 1.

FIG. 6*b* is a magnified view of a stage portion of the closing apparatus of FIG. 6*a*.

DETAILED DESCRIPTION

Figure 1A:
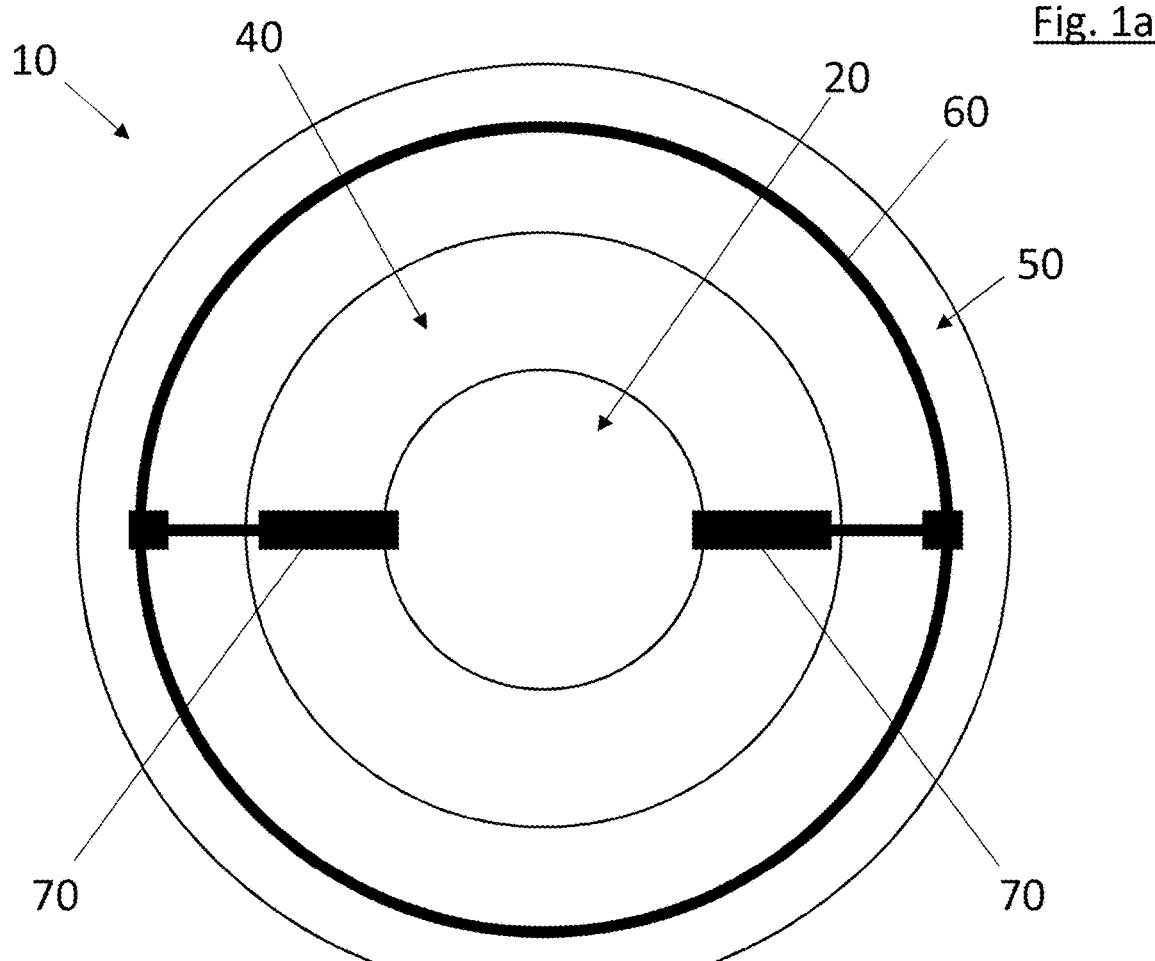
FIG. 1*a* is a schematic plan view of an example contact lens manufactured by the example methods described herein.

As described herein, the present invention is based on the discovery of the difficulty in satisfactorily bonding two members together as part of a process of manufacturing a lens assembly, such as a contact lens or contact lens component, that includes one or more components positioned between the two members. Prior to the present invention, alignment between the two preformed members was difficult to control and would frequently result in misalignment and/or incomplete bonding between the members making the resulting contact lens unacceptable for optical measurements or use. By using an example embodiment of the present method, yields have improved from approximately 10% to over 80% without cosmetic bonding faults such as creasing and edge faults.

Now, using the presently described methods and apparatus, the inventors are observing about fifty percent or more of successfully bonded lenses that are within the optical quality specifications. Examples of the benefits observed with the present methods and apparatus include a reduction in wrinkles or distortions of the lens assemblies, improved bonding between the two members of the lens, improved optical quality of the lenses, and successful bonding of the members to the included component with little or no optical distortion or physical distortion, or combinations thereof. And, with the present methods and apparatus, instead of requiring a strong force or pressure to couple the members together, it is now possible to couple the members together at lower levels or force and/or by simply controlling the distance between the two supports and allowing the two supports to be simply placed in contact with each other.

The lens assembly may be an ophthalmic lens, for example a contact lens. Alternatively, the lens assembly may be a capsule for inclusion in an ophthalmic lens. The capsule may form or define the optic of the ophthalmic lens or contact lens. The ophthalmic lens may then be formed around the capsule, for example by repeating the method of the present invention, now with the capsule being the component placed onto (a different) first lens member. Alternatively, the ophthalmic lens may be formed around the capsule by cast molding a lens precursor material around the capsule.

In any of the present methods, the compliant stage is more pliable (i.e. softer and/or less stiff and/or more flexible) than a first mold part and/or second mold part used to form the first or second lens member that are coupled together. That is to say, all other factors being the same (such factors including but not being limited to speed of deformation and direction of force), the resistance offered by the compliant stage to deformation is less than the resistance offered by the first and/or second mold parts. For example, the force required per unit deformation of the mold part (when all other factors are the same) may be at least 5%, for example at least 10%, for example at least 20% greater than the force per unit deformation of the compliant stage. For example, the compliant stage may be flexed or compressed by pressing two fingers together with the compliant stage located between the fingers, and in comparison, a mold part used in the present methods may not be flexed or compressed by pressing two fingers together with the mold part located between the fingers. Examples of materials used to make mold parts include plastics such as polyolefins (e.g., polypropylene), polystyrenes, and vinyl alcohol copolymer materials (e.g. ethylvinyl alcohol), and the like.

As stated herein, the use of such a compliant stage to compress the lens members, which are pre-formed, while the lens members are coupled together facilitates ensuring proper alignment and sufficient coupling of the first and second lens members. For example, the contact between the first lens member and the second lens member is more complete than when the both lens members are provided on a rigid convex surface or concave surface, such as the rigid mold parts described above. As an example, the contact surface between the two members can completely extend around the circumference of the lens body. However, it is also conceivable that in some methods, for example where a fluid-tight seal is not required, a contact surface that occupies less than 100% of the circumference of the body, for example at least 80% of the circumference of the lens body, or at least 90% of the circumference of the lens body would still yield sufficient coupling and alignment to meet the optical performance specifications of the lens body.

The compliant stage may be convex. The compliant stage may be concave. The compliant stage may have a surface topography selected to provide coupling between the lens members only at selected locations on their surface: for example, the compliant stage may include a ring-shaped protrusion on its surface, selected to produce a ring of bonding between the first and second lens members.

The pliability of the compliant stage may be achieved by using pliable materials in the compliant stage and/or by the form and/or construction of the compliant stage. The compliant stage may comprise, consist essentially of, or consist of a material that is more pliable than the material of the first mold part and/or second mold part. As an example, in embodiments of the present methods, the compliant stage may comprise, consist essentially of, or consist of a low-modulus rubber, a homogenously soft sponge, or a fluid (i.e. gas or liquid) filled bag. As one example, in embodiments of the present methods, the compliant stage may comprise, consist essentially of, or consist of a silicone elastomer material. Silicone elastomer materials can be obtained from companies such as NuSil Technology (Carpinteria, Calif., USA) and Dow Chemical Company (under the brand name Sylgard). The compliant stage may comprise, consist essentially of, or consist of a stage body which comprises, consists essentially of, or consists of a pliable material, that is to say a material that is less stiff (i.e. more pliable) than the material of the first and/or second mold parts. The compliant stage may comprise, consist essentially of, or consist of a stage body which is shaped and configured such that (all other factors being equal) it is less stiff (i.e. more pliable) than the material of the first and/or second mold parts. For example, the compliant stage may comprise, consist essentially of, or consist of a material that is more pliable than a polypropylene lens mold member. In some examples, the compliant stage may be formed from a cured rubber material having a Shore A hardness from 3 to 50. In a further example, the compliant stage may be formed from a cured rubber material having a Shore A hardness from 5 to 10. The rubber material may be a silicone elastomer or latex elastomer. In some other examples, the compliant stage may have a Young's modulus from 0.05 MPa to 2 MPa. For example, the Young's modulus may be from 0.1 MPa to 1 MPa. In one example, a silicone elastomer material that has a Shore A hardness of 50 can be used in the present methods and in the present apparatus. The Shore A hardness or the Young's modulus as well as other physical properties of the material to make the compliant stage can be obtained from the technical data sheets provided by the material suppliers or material manufacturers.

A surface of the compliant stage may be shaped and configured to support a lens member during coupling of that lens member to another lens member. The surface of the compliant stage body may be convex, concave or a combination thereof. It is thought that it is particularly beneficial that the surface upon which a lens member is supported when placed upon the compliant stage is more pliable than the surface of the first mold part and/or second mold part on which a lens member is supported during the formation of the lens member.

As used herein, the term "contact lens" means an ophthalmic lens that can be placed on the eye of a person. It will be appreciated that such a contact lens will provide clinically acceptable on-eye movement and not bind to the eye or eyes of a person. The contact lens can be in the form of a corneal contact lens (e.g., a lens that rests on the cornea of an eye) or a scleral contact lens (e.g., a lens that rests on the sclera of an eye).

As used herein, the term "lens member" means a component body element that is attached to other component body elements (lens members) to form a lens body. The resulting assembled lens body is referred to as a lens assembly. For example, a "lens member" may be a component body element shaped to receive an included component, or a "lens member" may be a component body element shaped to cover a component, the component being received in another component body element. A lens member will typically not itself be a lens, although it may be.

The lens assembly produced with the present method and apparatus comprises a first lens member and a second lens member assembled together. The lens assembly can further comprise at least one component. The at least one component may be a fluid component or a rigid component. As used herein, "rigid" means that the rigid component is less flexible or more stiff than the first or second lens member. Technically speaking, the rigid component may still be flexible, as in the case of flexible or stretchable electronic components, but it will be less flexible than the first or second lens member. That is to say, all other factors (such factors including but not being limited to speed of deformation and direction of force) being the same, the resistance offered by the rigid component to deformation is greater than the resistance offered by the first and/or second lens members. For example, the force required per unit deformation of the rigid component (when all other factors are the same) may be at least 5%, for example at least 10%, for example at least 20% greater than the force per unit deformation of the first and/or second lens members.

The lens assembly (e.g. the first and second lens members and the included component) may form the whole or a portion of a contact lens, for example a portion of a corneal contact lens or a portion of a scleral contact lens, for example an optic portion of a contact lens. The lens assembly may be substantially circular in shape and have a diameter from about 4 mm to about 20 mm. Thus, the lens assembly can have a diameter that is less than the diameter of the entire contact lens. In some embodiments, the lens assembly has a diameter from 5 mm to 18 mm. In further embodiments, the lens assembly has a diameter from 7 mm to 15 mm.

The lens assembly has an anterior surface and an opposing posterior surface; the anterior surface faces away from the eye when the contact lens is located on an eye, and can have a generally convex shape, and the posterior surface is oriented towards the eye when the contact lens is located on an eye, and the posterior surface can have a generally concave shape.

Each lens member described herein can be planar, or it can be curved thereby forming a concave or a convex surface, or both. In some embodiments, the lens assembly comprises a posterior (or back) lens member and an anterior (or front) lens member.

One or more components can be placed on a surface of a lens member, for example placed on a posterior surface of the anterior lens member or an anterior surface of the posterior lens member. One or more components can be received in a recess formed in a surface of a lens member, for example a recess formed in a posterior surface of the anterior lens member or an anterior surface of the posterior lens member. The posterior member, for example the anterior surface thereof, is placed in contact with the anterior member, for example the posterior surface thereof, to sandwich the component therebetween. The resulting "sandwich" assembly can be understood to form a lens assembly forming the whole or a part of a contact lens.

The at least one component may be placed on the first lens member by placing the first lens member onto the (or another) compliant stage and, while the at least one component is located on the compliant stage, bringing the component and the first lens member into contact with each other, the compliant stage providing compression to the component and the first lens member.

Alternatively, the at least one component can be placed on the first lens member while the first lens member is located on the compliant stage. Or, the at least one component can be placed on the first lens member when the first lens member is located on a rigid stage, and the second lens member is located on the compliant stage.

The lens members used with the present methods and apparatus can be formed by cast molding processes, spin cast molding processes, or lathing processes, or a combination thereof. As understood by persons skilled in the art, cast molding refers to the molding of a lens member by placing a lens forming material between a female mold member having a concave lens member forming surface, and a male mold member having a convex lens member forming surface.

The lens member material, as it is used as a portion of a contact lens or as an entire contact lens is visually transparent (although it can include a handling tint). Each of the first and/or second lens members can be formed from a hydrogel material, a silicone hydrogel material, or a silicone elastomer material. In other words, a lens member used with the present methods and apparatus can comprise, consist essentially of, or consist of a hydrogel material, a silicone hydrogel material, or a silicone elastomer material. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as used herein, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as used herein, has a water content from about 0% to less than 10% (wt/wt). Typically, the silicone elastomer materials used with the present methods or apparatus have a water content from 0.1% to 3% (wt/wt).

The present methods may comprise one or more of the following steps:

Forming a first lens member and a second lens member (a molding step);

Providing the first lens member or the second lens member or both on a compliant stage;

In the case that only one of the first lens member and the second lens member is provided on a compliant stage, providing the other of the first lens member or the second lens member on a compliant stage or a rigid stage or a mold part;

Providing a component mounted on one of the first or second lens members;

Bringing the first and second lens members into contact such that the component is located therebetween (a contacting step);

Coupling the first and second lens members together to form a lens assembly (a coupling step).

The present methods may further comprise one or more of the following additional steps:

Removing the lens body from the stage and/or mold parts;

Washing the lens body with or without organic solvents, water, or combinations thereof;

Packaging the lens body in a contact lens package. The contact lens package is then sealed and sterilized using conventional techniques.

The present methods may include a step of forming each of the first and second lens members in a molding assembly, which comprises a first mold part and a second mold part assembled together. In the case of hydrogel members or silicone hydrogel members, the members can be made by polymerizing a hydrogel or silicone hydrogel lens formulation that includes a polymerization initiator in a lens member shaped cavity formed between the first mold part and the second mold part, which both mold parts are rigid, as defined herein. For silicone elastomer members, the members can be made by curing, vulcanizing, or catalyzing, such as by hydrosylation, a liquid silicone elastomer material in a lens member shaped cavity formed between the first mold part and the second mold part. The surface of each mold part that forms the lens member shaped cavity may be convex, concave, planar or a combination of thereof. After formation of the lens member, the two mold parts are separated such that the lens member remains attached to the surface of one of the mold parts. As a result, a lens member is provided on a surface of the first or second mold part. In some other embodiments, it may be desirable to place the lens member on a surface of a mold part that was not used to produce the first lens member, but that may require additional steps to achieve the desired alignment of the member to the mold part.

The present methods also include a step of providing one or more lens members on a compliant stage, wherein the compliant stage has a greater flexibility than the first and/or second mold parts. One, or both, of the first and second lens members is removed from the mold part to which it remains attached after separation of the first and second mold parts. The removed lens member, or each of the removed lens members, is then placed on a compliant stage, described more fully herein. The placement can be done manually, or it can be done using an automated machine, such as a robotic device. Thus, in practicing the present methods, each of the first and/or second lens members is provided on a compliant stage.

In the illustrated embodiments described herein, in the formation of the second lens member, the second mold part comprises a concave surface and the first mold part comprises a convex surface, the first and second surfaces of the mold parts forming a second lens member shaped cavity therebetween. The second lens member is formed between the first and second surfaces of the mold parts. After formation of the second lens member, the two mold parts are separated such that the second lens member remains attached to the concave surface of the first mold part. As a result, a second lens member is provided on a concave surface of the first mold part. Thus, the present methods include a step of providing a second lens member on a concave surface of a first mold part of a lens member molding assembly, which assembly includes a first mold part and a second mold part. In this context, the first lens member is formed in a lens member molding assembly of two mold parts, as described above with reference to the second mold part. However, unlike the second lens member, the first lens member is removed from the mold part to which it remains attached after separation of the first and second mold parts. The removed first lens member is then placed on a compliant stage, described more fully herein. Thus, in practicing the present methods, the first lens member is provided on the compliant stage. In some embodiments, after formation of the first lens member, the two mold parts are separated such that the first lens member remains attached to the convex surface of the second mold part. The first lens member can be separated from the second rigid mold part, and it can then be placed on the convex surface of the compliant stage.

In other embodiments, the second lens member is removed from the mold part to which it remains attached after separation of the first and second mold parts. The removed second lens member may then be placed on a rigid stage or, preferably, it is then placed on a compliant stage, described more fully herein. Thus, in some embodiments, the second lens member is also provided on the compliant stage.

In any of the present methods, the compliant stage provided as a support for a lens member is of a material that is more pliable than the material of the first mold part and/or second mold part. As stated herein, using a deformable material to form the compliant stage facilitates ensuring proper alignment and sufficient coupling of the second lens member to the first lens member. For example, the contact between the second lens member and the first lens member is more complete than when both the first lens member and the second lens member are provided on a rigid surface. As an example, the contact surface between the two lens members can completely extend around the circumference of the lens body. However, as described above, it is also conceivable that in some methods, a contact surface that occupies at least 80% of the circumference of the lens body, or at least 90% of the circumference of the lens body would still yield sufficient coupling and alignment to meet the optical performance specifications of the lens body. As one example, in embodiments of the present methods, the compliant stage may comprise, consist essentially of, or consist of a silicone elastomer material.

In the present methods, at least one component is placed in contact with the first lens member or the second lens member. Said at least one component can be placed on a surface of a lens member, for example can be received in a recess formed in a surface of a lens member. The at least one component can be an electronic component, or it can be a device to provide some physical structure to the lens assembly, as described herein.

In the illustrated embodiments described herein, the at least one component is placed on the second lens member. After formation of the lens assembly, the at least one component will be located in the lens assembly between the first lens member and the second lens member.

The at least one component may comprise a liquid crystal component, for example a liquid crystal optic. The diameter of the optic may be 4 mm to 8 mm, preferably 5 mm to 7 mm. The liquid crystal optic may include two stacked liquid crystal cells, or, alternatively, in some embodiments it may comprise a single liquid crystal cell. A liquid crystal cell has a conventional meaning as understood by persons of ordinary skill in the art.

After the at least one component is placed in contact with the first lens member or the second lens member, the methods of the present invention then include a step of bringing the first and second lens member into contact such that the at least one component is located therebetween. This may be referred to as a contacting step. The contacting step is carried out while one of the first or second lens members is on a compliant stage. The other of the first or second lens members may be on a compliant stage or a rigid stage or a mold part during the contacting step. The first and second lens members are brought into contact such that the compliant stage provides compression to the first lens member, the second lens member and the at least one component. The compliant stage on which the first or second lens member is located provides compression in conjunction with the mold part or compliant stage on which the other of the first or second lens member is located. The first and second lens members are brought into contact such that the first and second lens members are aligned.

In an example embodiment, after the at least one component is placed on the second lens member, the methods of the present invention then include a step of placing the first lens member located on the compliant stage in contact with the second lens member on the mold part or a rigid stage or a compliant stage such that the second lens member is aligned with the first lens member, and the compliant stage provides compression to the first lens member and the second lens member.

Once the first and second lens members are in contact, the methods of the present invention then include a step of coupling the first and second lens members to form the lens assembly, for example a lens assembly in which the at least one component is encapsulated. The coupling can be achieved using an adhesive, or curing the components together, and the like.

This coupling step of the method may include one or more of the following steps, elements of each step being defined in more detail in relation to the various embodiments below;

Modifying a surface of the first and/or second lens member, for example such as by plasma treatment prior to bringing the first and second lens members into contact;

Bonding the second lens member to the first lens member, for example by heating the first and second lens members while they are in contact;

Clamping the first and second lens members while they are in contact, for example before bonding; and adhering the first and second lens members together using an adhesive, such as a chemical adhesive.

In the illustrated embodiments described herein, once the second lens member and the first lens member are in contact, the present methods include a step of coupling the convex surface of the first lens member to the concave surface of the second lens member to form the lens assembly with the at least one component located between the first and second lens members.

In some embodiments, the methods may include a step of modifying a surface, e.g. a concave surface, of the second lens member and/or modifying a surface, e.g. a convex surface, of the first lens member by exposing the second lens member and/or the first lens member respectively to a plasma treatment process. In other words, the surfaces of the first and second lens members can be activated by exposing them to plasma. Any conventional plasma activation process and equipment can be used, as understood by persons of ordinary skill in the art. For example, treatments include low pressure oxygen plasma, atmospheric oxygen plasma, UV ozone surface treatment, and corona (arcing) treatment.

Embodiments of the present methods can include a step of heating the lens assembly to bond the second lens member to the first lens member, for example after plasma treatment of the member surfaces. The heating of the lens body can occur by placing one or more coupled lens bodies in a thermal oven at a desired temperature for a period of time to ensure that the two lens members bond together. For example, the coupled lens assemblies can be placed in an oven set at a temperature from 40 degrees Celsius (C) to 100 degrees C., for example from 80 degrees C. to 90 degrees C. The coupled lens assemblies can be placed in the oven to bond for a period of time from 30 seconds to 180 minutes, for example from 30 seconds to 2 minutes. The bonding in the oven can be achieved in an oxygen-free curing atmosphere, such as in an oven having a nitrogen blanket, or the atmosphere can include oxygen, such as in an oven heating ambient air. In addition, the bonding can occur in an oven that is set at a single temperature for the entire bonding phase, or the bonding can occur where a predetermined temperature profile is provided, such that the temperature changes after a desired amount of time.

In embodiments where the lens members are heated after being brought into contact, the compliant stage material should be chemically inert so as to not react with the lens member located thereon, and heat resistant so as to not become damaged or distorted during the heating.

In any of the present methods, the coupling step can include clamping together (i) a compliant stage having one of the first or second lens member located thereon, and (ii) a compliant stage or a rigid stage or a mold part having the other of the first or second lens member located thereon. Thus, the first and second lens members and the component may be compressed by the compliant stage by clamping together the compliant stage on which one of the first or second lens members is located and the compliant stage or rigid stage or mold part on which the other of the first or second lens members is located. This clamping may be carried out before and/or during any bonding step.

For any step of the present methods, a mold part (for example a mold part having a lens member located thereon) may be mounted on a mold support. Similarly, a compliant stage (for example a compliant stage having a lens member located thereon) may be mounted on a stage support. The mold support and the stage support can each be structured as a tray capable of having one or more of the mold parts and one or more of the compliant stages mounted thereon, respectively. The mold support may comprise one or more features configured to receive a portion of a mold part, for example a portion of the first or second mold parts therein. In some embodiments, the mold or stage support comprises one or more recesses or seats, each recess or seat being configured to receive a portion or a mold part of a portion of a stage therein respectively. In some embodiments, the stage support comprises a tray having one or more compliant stages affixed to the surface thereof or cast molded in receptacles on or forming part of the tray. The convex surface of at least one of said one or more compliant stages may project away from a surface of the tray. Additionally, or alternatively, the concave surface of at least one or more compliant stages may project into a surface of the tray. The trays can be made of any suitable heat resistant material, including metallic materials, such as steel or aluminum, or even carbon fiber-based trays.

The clamping can comprise clamping a stage support having at least one compliant stage mounted thereon to either a stage support or a mold support. Thus, the clamping may comprise clamping (i) a stage support and a mold support or (ii) two stage supports together. In some embodiments the method comprises a step of mounting one or more mold parts having a lens member located thereon on a mold support. The one or more mold parts may be mounted on the mold support prior to the contacting step and/or prior to clamping step. In some embodiments the method comprises placing a lens member on a compliant stage mounted on a stage support. For example, the lens member may be transferred from a mold part to the compliant stage mounted on the stage support.

In the illustrated embodiments described herein, the mold support and the stage support can each be structured as a tray capable of holding one or more of the mold parts and one or more of the lens members on the compliant stages, respectively. The trays can be made of any suitable heat resistant material, including metallic materials, such as steel or aluminum, or even carbon fiber-based trays. In some embodiments, the mold support is provided as a tray having at least one hole dimensioned to receive a portion of at least one first rigid mold part, and the lens member support is provided as a tray having at least one compliant stage having a surface projecting away from a surface of the tray, as described herein.

In some illustrated embodiments described herein the coupling step includes clamping a mold support, having the second mold part located thereon, and a lens member support, having the compliant stage as an element of the lens member support, to each other to provide the contact between the first lens member and the second lens member In other illustrated embodiments described herein the coupling step includes clamping a second lens member support, having a second compliant stage as an element of the member support, and a first member support, having a first compliant stage as an element of the member support, to each other to provide the contact between the first lens member and the second lens member.

The methods can include a step of applying a lubricant to a surface of the compliant stage prior to placing a lens member thereon. In some embodiments, the methods can include a step of applying a lubricant to the surface of the compliant stage prior to placing the separated lens member, for example the first lens member, on the surface of the compliant stage.

When the method includes a bonding step carried out in a vacuum, e.g. plasma bonding, the lubricant will generally be a substance that does not boil in the vacuum.

The lubricant may be a surfactant. Suitable surfactants that can be applied to the compliant stage include surfactants that include ethylene oxide units, such as poloxamer surfactants and poloxamine surfactants, or polysorbate-based surfactants, such as polysorbate-80 (TWEEN 80), and the like. In a particular embodiment of the present methods, the surfactant is a poloxamer surfactant. For example, the surfactant may be poloxamer 407, also known as Pluronic F-127 (Sigma Aldrich).

The lens assembly may include one or more rigid components. The rigid components can be electroactive elements or they can provide structural properties without any electroactivity, or both. In embodiments of the present methods, the at least one rigid component provided in the lens assembly comprises, consists essentially of, or consists of a metallic material. In other embodiments, the at least one rigid component can be formed of a non-metallic material. For example, the rigid component may be made from a polyimide material, such as KAPTON (E. I. du Pont de Nemours and Company).

In embodiments of the present methods, the at least one rigid component is an antenna, or an electrode assembly, or a battery, or a sensor, or a combination thereof.

In some embodiments of the present methods, the at least one rigid component is a lens member spacing device having a circular shape.

The at least one component may comprise at least one fluid component. For example, the first lens member and the second lens member may define one or more cavities containing fluid.

The at least one component may be a medicament.

In embodiments of the present methods, the first lens member can comprise, consist essentially of, or consist of a hydrogel material. As one example, the first lens member can comprise, consist essentially of, or consist of a silicone hydrogel material. As another example, the first lens member can comprise, consist essentially of, or consist of a silicone-free hydrogel material. Examples of suitable lens formulations for the first lens member include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lo lotrafilcon B, somofilcon A, riofilcon A, delefilcon A, verofilcon A, and the like.

Alternatively, the first lens member can comprise, consist essentially of, or consist of a silicone elastomer material. For example, the first lens member can comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

Similarly, in embodiments of the present methods, the second lens member can comprise, consist essentially of, or consist of a hydrogel material. As one example, the second lens member can comprise, consist essentially of, or consist of a silicone hydrogel material. As another example, the second lens member can comprise, consist essentially of, or consist of a silicone-free hydrogel material. Examples of suitable lens formulations for the second lens member include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lo lotrafilcon B, somofilcon A, riofilcon A, delefilcon A, verofilcon A, and the like.

Alternatively, the second lens member can comprise, consist essentially of, or consist of a silicone elastomer material. For example, the second lens member can comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

In certain embodiments, the first and the second lens members are made of the same materials. For example, both the first and second lens members may be made of a hydrogel material. Or, both the first and second lens members may be made of a silicone hydrogel material. Or, the first and the second lens members may be made of a silicone elastomer material.

Although it may be preferable to couple two lens members together that are formed of the same material, other embodiments of the present methods may include coupling a first lens member and a second lens member together that are formed of different materials. For example, it may be desirable to form the lens member of a silicone-free hydrogel material and the lens member as a silicone hydrogel material. Or, it may be desirable to practice the present methods by coupling a silicone elastomer material to a silicone hydrogel material or to a silicone-free hydrogel material. Each of the various combinations is contemplated within the present invention.

In another aspect, the present invention provides an apparatus for making a lens body as described herein.

The apparatus comprises a stage support, for example a first and/or second stage support. Each stage support comprises a rigid base and at least one compliant stage. Each at least one compliant stage may be shaped to retain a first lens member or a second lens member. The apparatus may comprise a mold support. Each mold support being configured to retain at least one mold part.

In embodiments illustrated herein the first stage support has a convex (or concave) surface shaped to retain a first lens member, which is to be coupled to the second lens member located on the first mold part. As discussed herein, the compliant stage has a greater flexibility than the rigid base of a lens member support. The mold support comprises a first mold part seat that is shaped to support a first mold part of a lens member molding assembly. The first mold part has a second lens member located on a concave (or convex) surface of the second rigid mold part.

The apparatus also comprises a support coupler that is configured to retain the first stage support and the second stage support (if present) or a mold support (if present) together. When the first stage support and the second stage support/mold support are coupled together, the first lens member located on the compliant stage can be placed in contact with the second lens member such that the compliant stage provides compression to the first lens member and the second lens member, and the at least one component is positioned between the first lens member and the second lens member.

In embodiments illustrated herein, the apparatus also comprises a support coupler that is configured to retain the stage support and the mold support together. When the first stage support and the mold support are coupled together, the first lens member located on the compliant stage can be placed in contact with the second lens member located on the first mold part such that the compliant stage provides compression to the first lens member and the second lens member, and the at least one component is positioned between the first lens member and the second lens member.

In some embodiments of the apparatus, the mold support may comprise a plurality of first mold part and/or second mold part seats, and the stage support may comprise a plurality of compliant stages. Preferably, there are an equal number of mold part seats (either of the first and/or second type) and compliant stages such that there is a one to one relationship between them. As one example, the mold support may have one to one hundred first mold part seats and/or second mold part seats, and the stage support may have one to one hundred compliant stages.

In the foregoing embodiments, the first mold part seats may comprise a recess for receiving a convex surface of the first mold parts.

As stated herein, in any of the foregoing embodiments, the compliant stages may comprise a silicone elastomer material.

In any of the embodiments of the apparatus, the support coupler may comprise at least one clamp to hold the mold support and the lens member support together.

In further embodiments, the mold support may be a plate having a plurality of first rigid mold part seats that are openings dimensioned to receive a portion of the first rigid mold parts, and the stage support is a plate having a plurality of compliant stages, where each stage is shaped as a convex dome or concave depression extending from a surface of the plate.

A further advantage of using a compliant support that has been identified is that it allows stresses that may develop in the lens member during curing to be released. Taking the lens member off the mold and/or supporting it on a compliant support, allows the lens member to relax into its "true" shape unencumbered by stresses imposed by adhesions to mold surfaces.

An example lens assembly (FIG. 1) is a contact lens 10 having an optic zone 20 and an annular peripheral zone 30. When worn on an eye, the lens 10 rests on the cornea and the optic zone 20 approximately covers the pupil of the wearer, in the conventional manner. The optic zone 20 includes (FIG. 1b) a cavity 25 which in use is filled with a greater or lesser amount of a fluid, in this example saline. The peripheral zone 30 consists of an annular inner zone 40 and an annular outer zone 50. The annular inner zone 40 includes an annular fluid reservoir 45, in fluid communication with the cavity 25. The annular outer zone 50 includes a metal track 60 which acts as an antenna. The metal track is connected to a controller 70, which includes control electronics and a pump configured to pump the fluid to and from the fluid reservoir 45 and the cavity 25, in response to control signals received by the antenna, metal track 60 (the fluid connection channels between the reservoir 45 and the cavity 25 through which the fluid is pumped are not shown in the drawings). The power of the contact lens 10 is increased by pumping fluid from the fluid reservoir 45 into the cavity 25, inflating the optic zone 20 and thereby increasing the front curvature of the lens 10 and conversely the power is decreased by pumping fluid from the cavity 25 and into the fluid reservoir 45, deflating the optic zone 20 and thereby decreasing the front curvature of the lens 10. The lens 10 may thus be switched between a more positive optical power state that provides near (reading) vision to the wearer and a more negative optical power state that provides distance vision to the wearer.

Figure 1B:
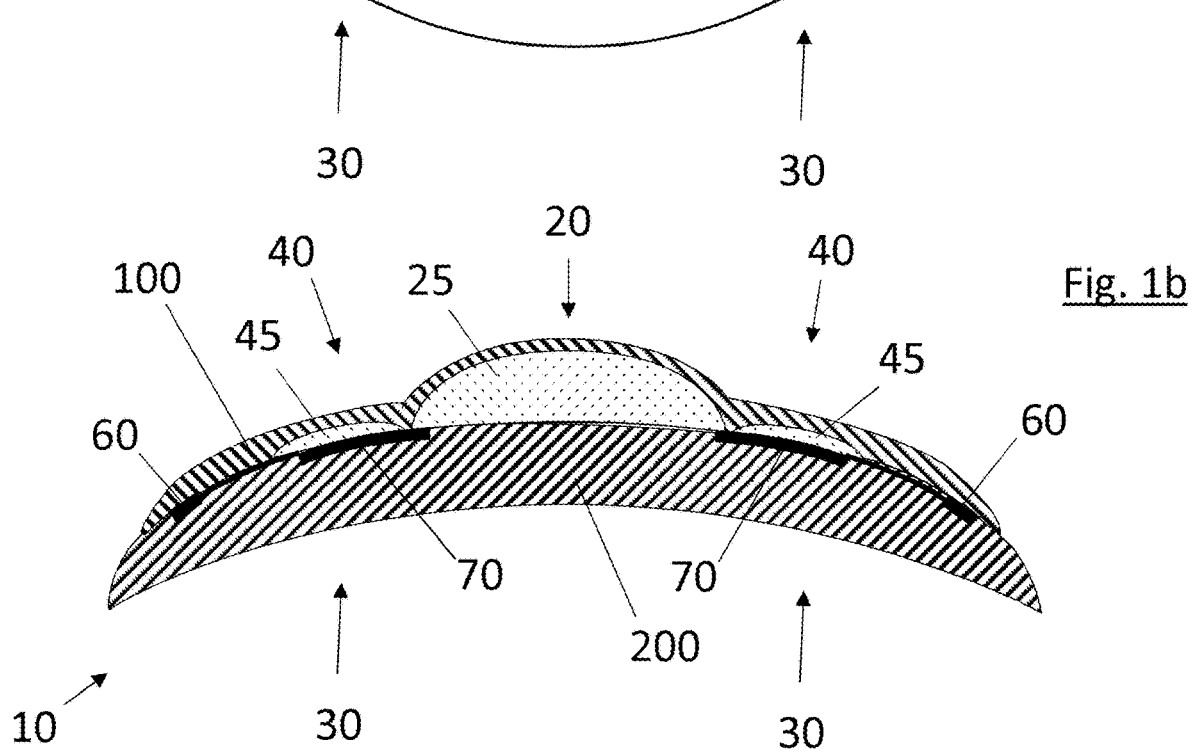
FIG. 1*b* is a schematic cross-sectional view of the example contact lens of FIG. 1*a*.

As shown in FIG. 1b, the lens 10 is formed from a front lens member 100 and a back lens member 200. The rear surface of the front lens member 100 includes recesses that define the (interior) front surfaces of the cavity 25 and the reservoir 45, with the respective (interior) back surfaces being formed by the front surface of the back lens member 200; thus, the cavity 25 and the reservoir 45 are formed when the back surface of the front lens member 100 is bonded to the front surface of the back lens member 200.

Figure 2A:
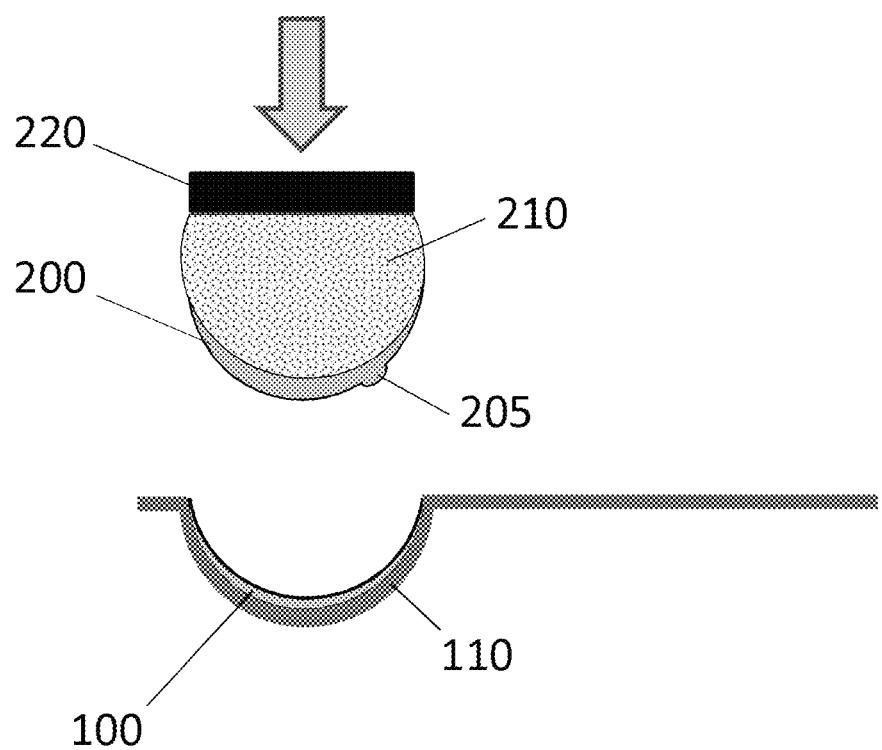
FIG. 2*a* and FIG. 2*b* illustrate two stages in a method of making the contact lens of FIG. 1*a*.
Figure 2B:
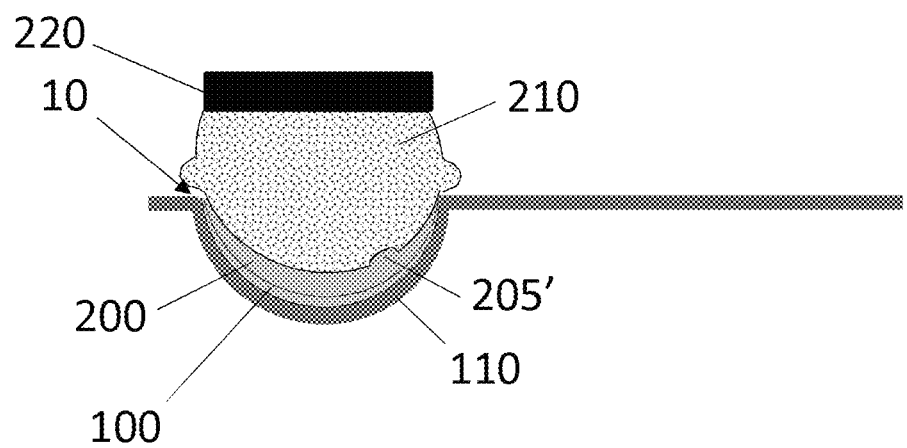

Irregularities in the surfaces that are to be bonded can result in imperfect bonding, which can cause distortions in the lens 10, which can render it optically and physically unusable as a contact lens, and result in leakage between the cavity 25 and the reservoir 45. An approach to solving that problem is shown schematically in FIG. 2. The front lens member 100 and the back lens member 200 are cast-molded in two-part molds, using standard techniques used to cast-mold contact lenses. The front lens member 100 is retained in one part 110 of the two-part mold in which it is cast. The rear lens member 200 is removed from both parts of the two-part mold in which it is cast, and is mounted on a compliant stage 210, which is in turn mounted in a sleeve 220 (FIG. 2a and FIGS. 3 & 4 below). The rear lens member 200 includes a protruding structure 205 (e.g. a protruding defect). The surfaces of the front lens member 100 and the rear lens member 200 that are to be bonded are surface treated and then they are brought together to form the lens 10 (FIG. 2b). Because the compliant stage 210 is softer and more pliable than the material of the lens members 100, 200, when the lens members 100, 200 are brought together the compliant stage 210 is compressed. In particular, the lens material forming the protruding defect 205' is forced away from the (relatively hard) interface between the lens members 100, 200 and into the (relatively soft) compliant stage 210. This results in a larger surface area of contact between the lens members 100, 200 than would have occurred had the rear lens member 200 been mounted on a hard stage, and hence improved bonding.

As mentioned above, taking the lens member 200 off the mold that was used to form it allows the lens member 200 to relax into its "true" or relaxed shape. The compliant stage 210 enables the lens member 200 to retain a substantially stress-free shape during the bonding process.

Figure 3A:
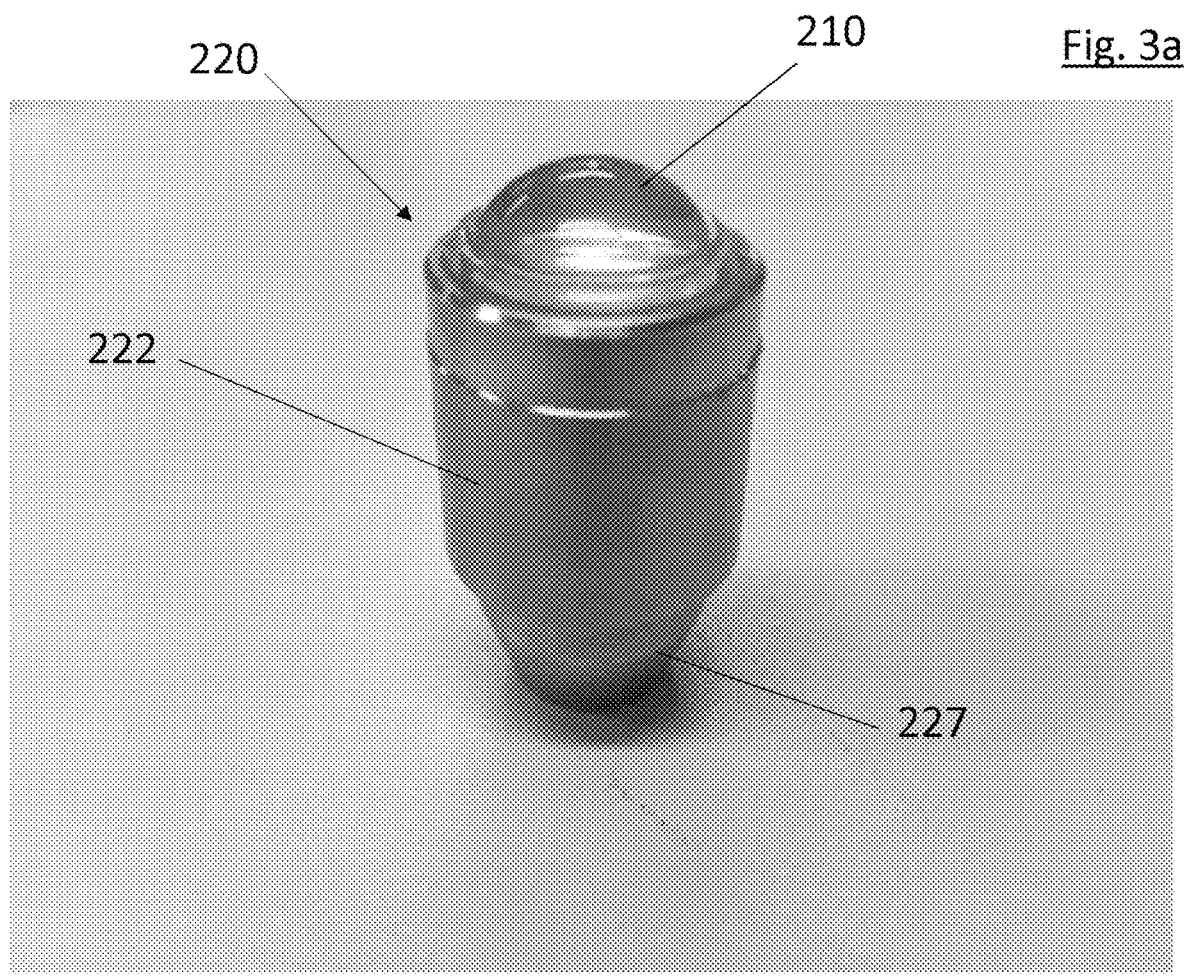
FIG. 3*a* is a perspective view of a component of an example apparatus used in the method of FIG. 2.
Figure 3B:
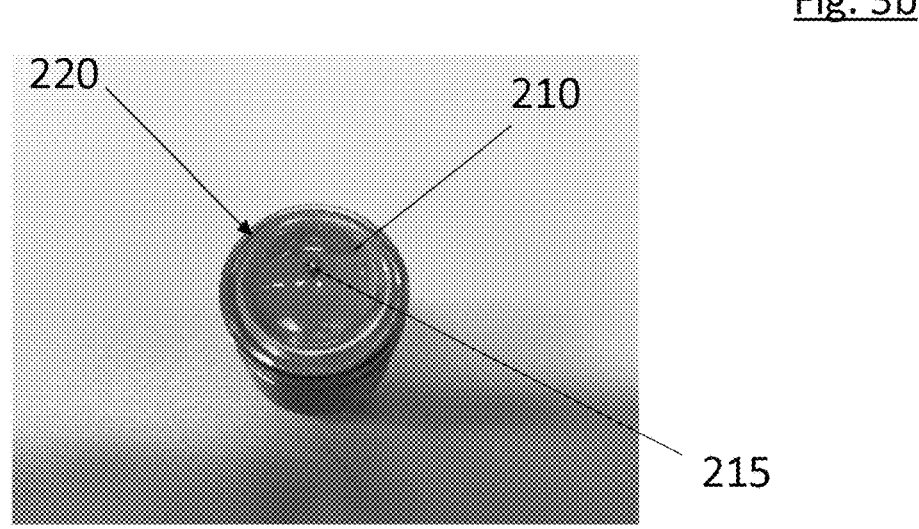
FIG. 3*b* is a top view of the component of FIG. 3*a*.

The example compliant stage 210 and mounting sleeve 220 are shown in more detail in FIG. 3. The mounting sleeve is shaped to be held in a chuck of a clamping apparatus, and has a cylindrical body portion 222 and a tapered tail portion 227 (FIG. 3a). The compliant stage 210 in this example is made from a silicone elastomer and protrudes from the body portion 222 to form a hemisphere having approximately the same radius as a contact lens. A metal ball 215 is provided within the hemisphere (FIG. 3b), at its center (in plan view) and close to its surface. The ball 215 is used to assist with centering the rear lens member 200 when it is mounted on the compliant stage 210. (Although the check is done manually in this example method, this feature could also be used to check centration in an automated environment by using recognition camera systems or equivalent.)

Figure 4A:
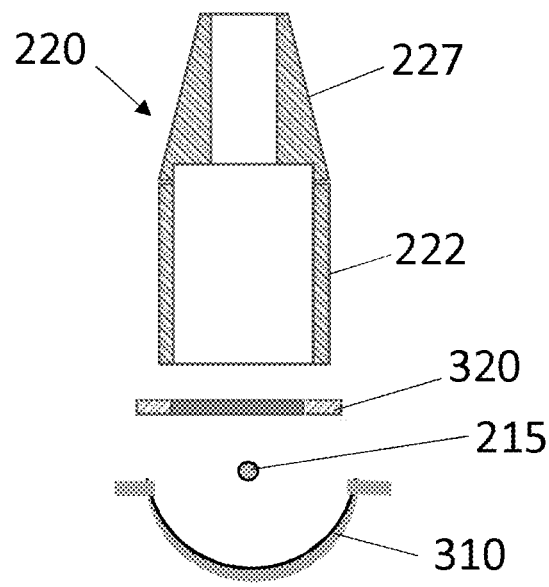
FIGS. 4*a*-4*d* illustrate four stages in an example method of manufacturing the component of FIG. 3*a* and FIG. 3*b*.
Figure 4B:
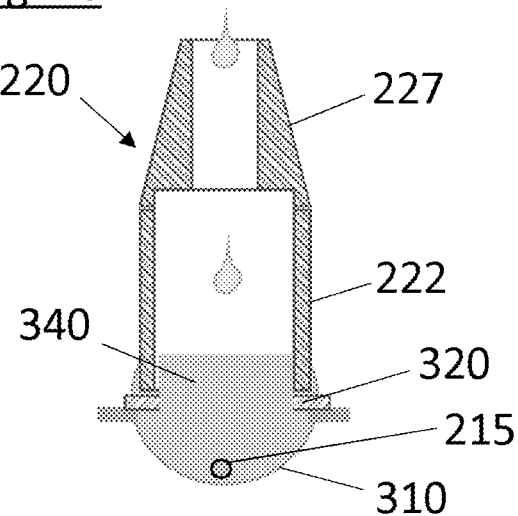
Figure 4C:
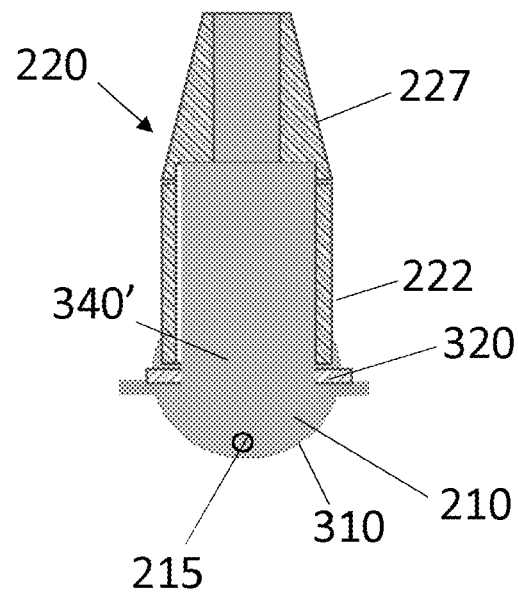
Figure 4D:
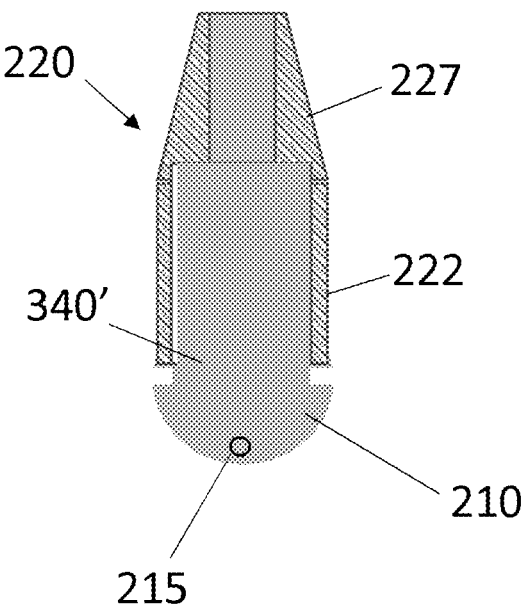

In an example method (FIG. 4) of manufacturing the example compliant stage 210 and mounting sleeve 220, the mounting sleeve 220 includes a bore running along its axis, the bore having a first, larger radius in the body portion 222 and a second, smaller radius in the tail portion 227. A dish-shaped mold 310 is provided (FIG. 4a) beneath the bore of the mounting sleeve 210. A spacing washer 320 is provided between the mounting sleeve 210 and the mold 310. The ball 215 is placed in the mold 310 and naturally falls to the center of its dish; it is thus self-centering. The mounting sleeve 210, washer 320 and mold 310 are brought together to form a liquid-tight seal and a silicone elastomer precursor material 340 is introduced into the bore of the mounting sleeve 210 (FIG. 4b). In this example, a sufficient amount of the precursor material is added to fill the bore completely (FIG. 4c). The precursor material is then cured to create the silicone elastomer compliant stage 210, which in this example completely fills the bore of the mounting sleeve 210. The mold 310 and washer 320 are then removed (FIG. 4d), leaving the finished compliant stage 210 in the mounting sleeve 220.

An example method of making the lens 10 will now be described in more detail, with reference to FIGS. 5 and 6. Droplets 420 of lubricant, in this example undiluted "Tween 80", are placed on the compliant stage 210 using a swab 410 (FIG. 5).

The back lens member 200 is manually removed from its mold (not shown), placed on the compliant stage 210 and manually centered by observation (using a microscope) of the metal ball 215. (Removal of the back lens member 200 and placement on the compliant stage 210 also allows for any residual tension caused by slight shrinkage of the lens member during cure to be released.) This assembly of compliant stage 210 and back lens member 200 is now ready for plasma bonding to a front lens member 100.

A mold assembly containing a front lens member 100 is split (not shown in the drawings) male mold part from female mold part. The front lens member 100 is left in the female half 540 of the mold. Any excess silicone elastomer ("flash") is removed from the female mold half 540. Dust and the like are removed from the front lens member 100 and the female mold half 540 using a de-ionizing air blast.

The compliant stage 210 and rear lens member 200 assembly and the female mold half 540 and front lens member 210 assembly are placed upright into a Tetra plasma chamber (not shown in the drawings) and an oxygen plasma treatment program is activated. When the program has finished, the parts are removed from the chamber.

Figure 6C:
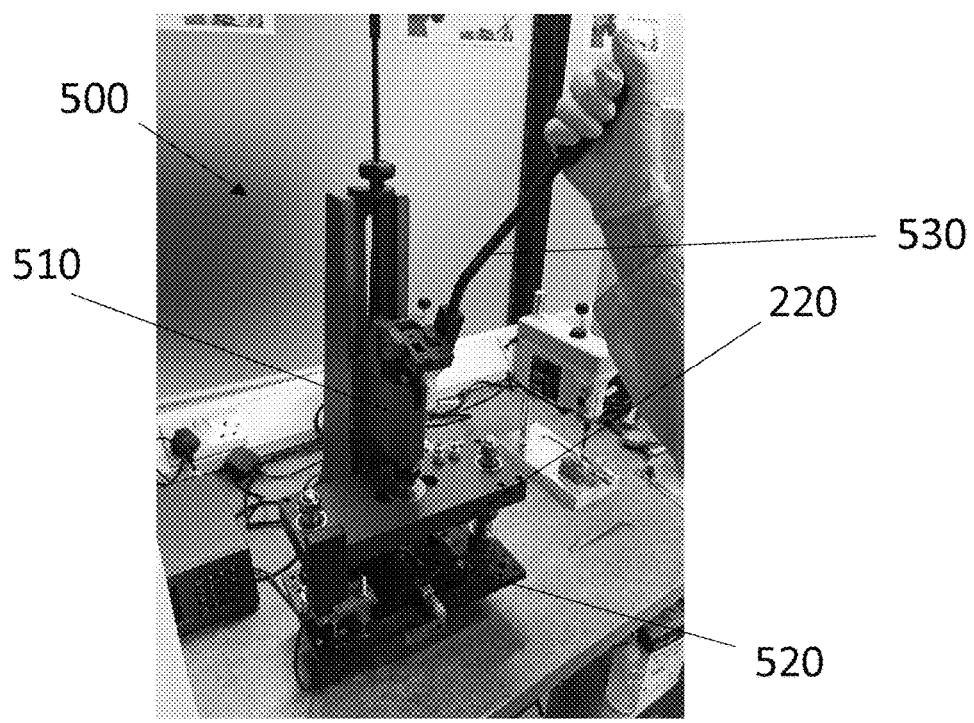
FIG. 6*c* is a perspective view of the closing apparatus of FIG. 6*a* in use.

The front lens member 100 and the rear lens member 200 are now bonded together as follows. The amount of fluid required for the cavity 25 and reservoir 45 is placed into the front lens member 100. The front lens member 100 and the rear lens member 200 are placed onto a lower platform 520 of a closing press 500 (FIGS. 6a & b). The sleeve 220, compliant stage 210 and rear lens member 200 are fitted into the upper closing press receptacle 510. The press handle 530 is pulled down to its mechanical stop (FIG. 6c) and light pressure is maintained for about 20 seconds. The press handle 530 is returned to its rest position and the female mold half 540, which now contains the rear lens member 200 bonded to the front lens member 100, is removed. In this example, the female mold half 540 and the bonded lens members 100, 200 are placed in a thermal oven (not shown) at about 85 degrees C. for about 60 seconds to ensure complete bonding.

The female mold half 540 and the bonded lens members 100, 200 are removed from the oven and the bonded lens members 100, 200 (now the lens 10) are removed from the mold half 540. The lens 10 is washed in deionized water and then de-gassed in a vacuum chamber (not shown).

When bonding lens members to form a fluid-filled lens, both portions must touch over the entirety of the surfaces surrounding the fluid that are to be bonded. Any areas that are not in contact will not bond. This method has been found to allow complete plasma bonding of parts that were very difficult to bond before now due to different shapes or deformations of the two portions (for example different radii, toricity, local bumps etc.). Using the compliant stage allows full contact in the area that is to be bonded. The shape of the compliant stage is cast as near as is possible to the shape of the back lens member but, due to its compliant nature, the shape of the compliant stage does not have to be exact.

It has been found that the closure pressure required for plasma bonding is close to zero—so long as the parts touch, they will bond.

Figure 7B:
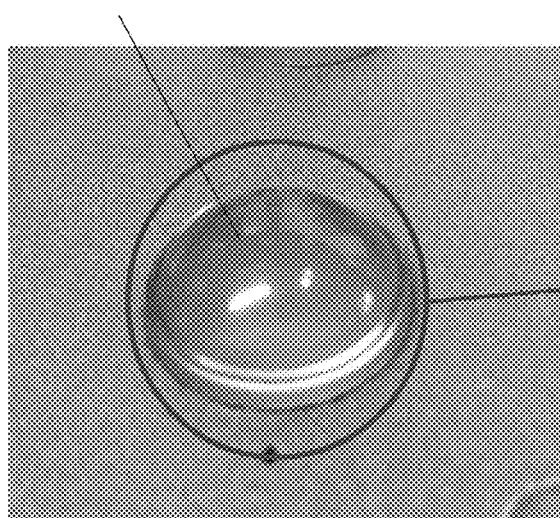
FIG. 7*b* is a close-up view of a compliant stage forming part of the alternative apparatus of FIG. 7*a*.
Figure 7A:
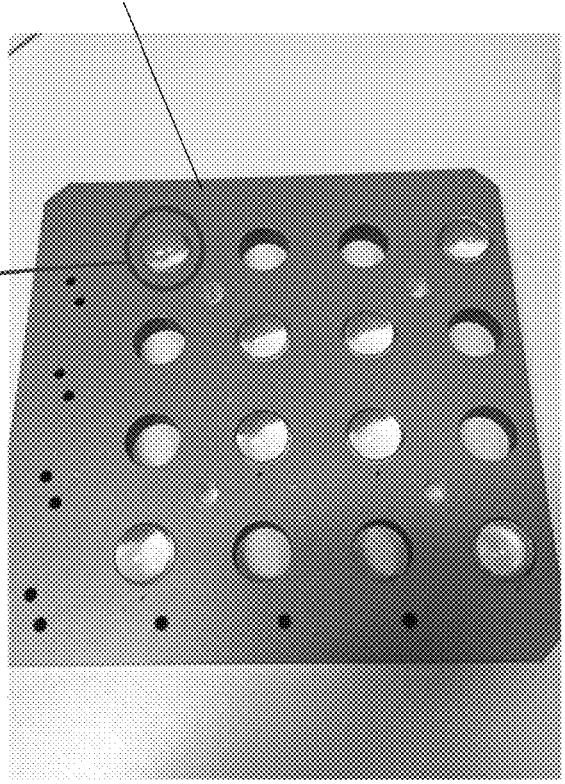
FIG. 7*a* is a plan view of a tray used in an example alternative apparatus used in the method of making the contact lens of FIG. 1.

In an alternative embodiment (FIG. 7), a plurality (eight in FIG. 7) of the compliant stages 210 are formed in holes in a metal plate 600. The array of compliant stages 210 is pressed against an array of corresponding female mold halves (not shown), enabling simultaneous bonding of a plurality of back lens members 200 to front lens members 100.

Although a manual process is described above, it is envisaged that the process will be automated for commercial production of the contact lenses 10.

The compliant stage 210 described above is made from a solid, albeit soft and pliable, elastomer. Alternatively, in other embodiments, the compliant stage may be filled with a fluid, e.g. it may be a fluid-filled "balloon".

In some embodiments, the lens has one or more intermediate lens members, between the front lens member and the back lens member, so that the lens is made from more than two layers. In such cases, the lens members may be bonded together simultaneously or the method may be repeated to bond successive layers together sequentially.

Additional aspects of the present invention can be envisioned as set forth in the following clauses:

1. A method for making a lens assembly that can be placed on an eye of a person, the lens assembly including at least one rigid element, the method comprising:
   providing a first pliable membrane (also known as a second lens member) on a concave surface of a first rigid mold part (also known as a first mold part) of a membrane molding assembly (also known as a molding assembly) comprising the first rigid mold part and a second rigid mold part (also known as a second mold part);

providing a second pliable membrane (also known as a first lens member) on a convex surface of a compliant stage, wherein the compliant stage has a greater flexibility than the first rigid mold part;

placing at least one rigid element in contact with the first pliable membrane or the second pliable membrane;

placing the second pliable membrane located on the compliant stage in contact with the first pliable membrane such that the second pliable membrane is aligned with the first pliable membrane, and the compliant stage provides compression to the first pliable membrane and the second pliable membrane; and coupling the second pliable membrane and the first pliable membrane together to form the lens assembly with the at least one rigid element between the first pliable membrane and the second pliable membrane.

2. The method of clause 1, further comprising forming the second pliable membrane in a membrane molding assembly comprising a first rigid mold part and a second rigid mold part; separating the second pliable membrane from the second rigid mold part; and placing the separated second pliable membrane on the convex surface of the compliant stage.

3. The method of clause 2, further comprising applying a lubricant to the convex surface of the compliant stage prior to placing the separated second pliable membrane on the convex surface of the compliant stage.

4. The method of any preceding clause, wherein the coupling comprises a step of bonding the second pliable membrane to the first pliable membrane.

5. The method of clause 4, further comprising modifying a concave surface of the first pliable membrane and a convex surface of the second pliable membrane by exposing the first pliable membrane and the second pliable membrane to a plasma treatment process.

6. The method of clause 4 or clause 5, further comprising heating the lens assembly to bond the second pliable membrane to the first pliable membrane.

7. The method of any preceding clause, wherein the first rigid mold part is located on a mold support, and the compliant stage is an element of a membrane support (also known as a stage support), and the coupling step comprises clamping the mold support and membrane support to each other to provide the contact between the first pliable membrane and the second pliable membrane.

8. The method of any preceding clause, wherein the at least one rigid element comprises a metallic material.

9. The method of any preceding clause, wherein the at least one rigid element is an antenna, or an electrode assembly, or a battery, or a sensor, or combinations thereof.

10. The method of any preceding clause, wherein the at least one rigid element is a membrane spacing device having a circular shape.

11. The method of any preceding clause, wherein the first pliable membrane comprises a hydrogel material.

12. The method of clause 11, wherein the first pliable membrane comprises a silicone hydrogel material.

13. The method of any one of clauses 1-10, wherein the first pliable membrane comprises a silicone elastomer material.

14. The method of any preceding clause, wherein the second pliable membrane comprises a hydrogel material.

15. The method of clause 14, wherein the second pliable membrane comprises a silicone hydrogel material.

16. The method of any one of clauses 1-10, wherein the second pliable membrane comprises a silicone elastomer material.

17. The method of any preceding clause, wherein the first pliable membrane and the second pliable membrane each comprises a hydrogel material.

18. The method of clause 17, wherein the first pliable membrane and the second pliable membrane each comprises a silicone hydrogel material.

19. The method of any one of clauses 1-10, wherein the first pliable membrane and the second pliable membrane each comprises a silicone elastomer material.

20. The method of any preceding clause, wherein the compliant stage comprises a silicone elastomer material.

21. An apparatus for making a lens assembly that can be placed on an eye of a person, the lens assembly including at least one rigid element, the apparatus comprising:

a mold support comprising a first rigid mold part seat (also known as a first mold part seat) shaped to support a first rigid mold part (also known as a first mold part) of a membrane molding assembly, the first rigid mold part having a first pliable membrane (also known as a second lens member) located on a concave surface of the first rigid mold part;

a membrane support (also known as a stage support) comprising a rigid base, and a compliant stage having a convex surface shaped to retain a second pliable membrane (also known as a first lens member) to be coupled to the first pliable membrane, wherein the compliant stage has a greater flexibility than the rigid base of the membrane support; and a support coupler configured to retain the membrane support and the mold support together so that a second pliable membrane located on the compliant stage can be placed in contact with a first pliable membrane located on the first rigid mold part such that the compliant stage provides compression to the first pliable membrane and the second pliable membrane with at least one rigid element positioned between the first pliable membrane and the second pliable membrane.

22. The apparatus of clause 21, wherein the mold support comprises a plurality of the first rigid mold part seats, and the membrane support comprises a plurality of the compliant stages.

23. The apparatus of clause 21 or 22, wherein the first rigid mold part seats comprise a recess for receiving a convex surface of the first rigid mold parts.

24. The apparatus of any one of clauses 21-23, wherein the compliant stages comprise a silicone elastomer material.

25. The apparatus of any one of clauses 21-24, wherein the support coupler comprises at least one clamp to hold the mold support and the membrane support together.

26. The apparatus of any one of clauses 21-25, wherein the mold support is a plate having a plurality of first rigid mold part seats that are openings dimensioned to receive a portion of the first rigid mold parts, and the membrane support is a plate having a plurality of the compliant stages, each stage shaped as a convex dome extending from a surface of the plate.

Although the disclosure herein refers to certain exemplified embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

The invention claimed is:

1. A method of making a lens assembly, the lens assembly comprising a first lens member, a second lens member and a component located therebetween, the method comprising:
   forming a first lens member;
   forming a second lens member;
   transferring the first lens member to a compliant stage;
   placing at least one component on the first lens member or the second lens member;
   while the first lens member is located on the compliant stage, bringing the first lens member and the second lens member into contact with each other such that the at least one component is located between the first lens member and the second lens member, the compliant stage providing compression to the first lens member and the second lens member; and
   coupling the first lens member and the second lens member together to form the lens assembly, wherein the lens assembly is a contact lens configured to be placed on an eye of a person.

2. The method of claim 1, wherein the component is a fluid.

3. The method of claim 1, wherein the component is a rigid object.

4. The method of claim 3, wherein the at least one rigid element comprises a metallic material.

5. The method of claim 4, wherein the at least one rigid element is an antenna, or an electrode assembly, or a battery, or a sensor, or combinations thereof and/or wherein the at least one rigid element is a membrane spacing device having a circular shape.

6. The method of claim 1, wherein the at least one component comprises a liquid crystal component.

7. The method of claim 1, further comprising forming the second lens member using a lens member molding assembly comprising a first mold part and a second mold part.

8. The method of claim 7, further comprising bringing the first lens member and the second lens member into contact while the second lens member is located on the first or second mold part used to form the second lens member.

9. The method of claim 1, further comprising transferring the second lens member to a second compliant stage and bringing the first lens member and the second lens member into contact while the second lens member is located on the second compliant stage such that the second compliant stage provides compression to the first lens member and the second lens member.

10. The method of claim 1, further comprising applying a lubricant to the surface of the compliant stage prior to placing a lens member thereon.

11. The method of claim 1, wherein the coupling comprises a step of bonding the first lens member to the second lens member.

12. The method of claim 1, wherein the coupling comprises modifying a surface of the first lens member, or second lens member, or both.

13. The method of claim 1, wherein the first lens member comprises a hydrogel material, a silicone hydrogel material or a silicone elastomer material and the second lens member comprises a hydrogel material, a silicone hydrogel material or a silicone elastomer material.

14. The method of claim 1, wherein the compliant stage comprises a silicone elastomer material.

15. The method of claim 1, wherein the at least one component is placed on the first lens member by placing the first lens member onto the compliant stage and, while the at least one component is located on the compliant stage, bringing the component and the first lens member into contact with each other, the compliant stage providing compression to the component and the first lens member.

16. An apparatus for making a lens assembly, the lens assembly comprising a first lens member and a second lens member and at least one component located therebetween, the apparatus comprising:
   a first stage support comprising at least one compliant stage comprising a convex surface configured to retain a first lens member;
   a second support; and
   a support coupler configured to retain the first stage support and the second support together so that a first lens member located on said at least one compliant stage of the first stage support can be placed in contact with a second lens member located on the second support such that each compliant stage provides compression to the first lens member and the second lens member with the at least one component positioned between the first lens member and the second lens member, wherein the compliant stage has a surface topography selected to provide coupling between the lens members only at selected locations on their surface.

* * * * *